(12) United States Patent
Kaneko et al.

(10) Patent No.: US 9,863,810 B2
(45) Date of Patent: Jan. 9, 2018

(54) OPTICAL DEVICE FOR IMPROVED WAVELENGTH RESOLUTION AND WAVELENGTH ACCURACY

(71) Applicants: Yokogawa Electric Corporation, Tokyo (JP); YOKOGAWA TEST & MEASUREMENT CORPORATION, Tokyo (JP)

(72) Inventors: Tsutomu Kaneko, Tokyo (JP); Manabu Kojima, Tokyo (JP)

(73) Assignees: Yokogawa Electric Corporation, Musashino-shi, Tokyo (JP); YOKOGAWA TEST & MEASUREMENT CORPORATION, Musashino-shi, Tokyo (JP)

( * ) Notice: Subject to any disclaimer, the term of this patent is extended or adjusted under 35 U.S.C. 154(b) by 19 days.

(21) Appl. No.: 14/986,861

(22) Filed: Jan. 4, 2016

(65) Prior Publication Data
US 2016/0195433 A1 Jul. 7, 2016

(30) Foreign Application Priority Data
Jan. 7, 2015 (JP) ................................. 2015-001400

(51) Int. Cl.
| | |
|---|---|
| *G01J 3/18* | (2006.01) |
| *G02B 27/28* | (2006.01) |
| *G01J 3/26* | (2006.01) |
| *G02B 27/00* | (2006.01) |
| *G01J 3/02* | (2006.01) |
| *G02B 17/00* | (2006.01) |

(Continued)

(52) U.S. Cl.
CPC ................. *G01J 3/18* (2013.01); *G01J 3/021* (2013.01); *G01J 3/0208* (2013.01); *G01J 3/0216* (2013.01); *G01J 3/0224* (2013.01); *G01J 3/26* (2013.01); *G02B 17/008* (2013.01); *G02B 27/286* (2013.01); *G02B 27/4244* (2013.01); *G01J 2003/262* (2013.01); *G02B 5/3083* (2013.01)

(58) Field of Classification Search
CPC .. G01J 3/18; G01J 3/0208; G01J 3/021; G01J 3/0216; G01J 3/0224; G01J 3/26; G02B 5/3083; G02B 27/286; G02B 27/4244; G02B 27/0037; G02B 17/008
USPC ............ 359/494.01, 558, 566; 356/305, 326, 356/328, 331, 334
See application file for complete search history.

(56) References Cited

U.S. PATENT DOCUMENTS 4,198,123 A * 4/1980 Kremen ............... G02B 5/3083
356/317
5,028,134 A * 7/1991 Bulpitt ..................... G01J 3/02
356/328

(Continued)

FOREIGN PATENT DOCUMENTS

JP 2002-365592 A 12/2002

*Primary Examiner* — Frank Font
(74) *Attorney, Agent, or Firm* — Sughrue Mion, PLLC

(57) ABSTRACT

An optical device includes: a diffraction grating; a depolarization plate containing a birefringent material to eliminate polarization dependency of the diffraction grating; and an optical corrector configured to optically correct diffraction angle deviation of diffracted light due to diffraction at the diffraction grating. The optical corrector may be configured to bend back the diffracted light diffracted by the diffraction grating to re-emit the light to the diffraction grating.

12 Claims, 9 Drawing Sheets

(51) Int. Cl.
*G02B 5/30* (2006.01)
*G02B 27/42* (2006.01)

(56) References Cited

U.S. PATENT DOCUMENTS

| | | | |
|---|---|---|---|
| 6,744,506 B2 | 6/2004 | Kaneko et al. | |
| 7,075,644 B2* | 7/2006 | Yamamoto | G01J 3/02 356/326 |
| 7,177,089 B2* | 2/2007 | Kimura | G11B 7/1275 359/558 |
| 7,623,235 B2* | 11/2009 | Ho | G01J 3/20 356/328 |
| 7,933,021 B2* | 4/2011 | De Boer | A61B 3/102 356/479 |
| 2002/0186371 A1 | 12/2002 | Kaneko et al. | |
| 2006/0103841 A1* | 5/2006 | Ohishi | G01J 3/02 356/328 |
| 2010/0201981 A1* | 8/2010 | Stanke | G01J 3/02 356/328 |
| 2010/0202055 A1* | 8/2010 | Norton | G01J 3/02 359/568 |
| 2012/0038885 A1* | 2/2012 | Cense | A61B 3/102 351/206 |
| 2013/0169965 A1* | 7/2013 | Sunami | G02B 27/28 356/364 |

* cited by examiner

PRIOR ART

PRIOR ART

OPTICAL DEVICE FOR IMPROVED WAVELENGTH RESOLUTION AND WAVELENGTH ACCURACY

CROSS-REFERENCE TO RELATED APPLICATION

This application claims priority from Japanese Patent Application No. 2015-001400 filed with the Japan Patent Office on Jan. 7, 2015, the entire content of which is hereby incorporated by reference.

BACKGROUND

1. Technical Field

The present disclosure relates to an optical device.

2. Description of the Related Art

In light measurement, light in a polarized state is, in some cases, converted into light in an unpolarized state, i.e., light whose polarized state is cancelled. The light in the polarized state changes to the light in the unpolarized state in such a manner that any of factors including a time, a location, and a wavelength is changed.

For example, the diffraction efficiency of a diffraction grating used for a spectrometer changes depending on the relationship between the direction of a groove of the diffraction grating and the polarization state of incident light.

In order to accurately measure a wavelength level regardless of the polarization state of incident light, a depolarization plate is, as described in, e.g., JP-A-2002-365592, provided at an input portion of a spectrometer to eliminate the influence of the difference based on the relationship between the direction of the groove and the polarization state of incident light.

FIG. 7 is a diagram for describing the configuration of an example of a typical spectrometer (monochromator) described in JP-A-2002-365592. In this spectrometer, a depolarization plate is provided at an input portion. As illustrated in FIG. 7, an incident light beam 1 enters a depolarization plate 3 through an input slit 2. An optical path is shown by only one line in FIG. 7. However, the light is actually split into two beams by the depolarization plate 3.

Two light beams split by the depolarization plate 3 are converted into parallel light beams by a first concave mirror 4. Then, such light beams enter a plane diffraction grating 5, and then, are diffracted.

The light beams diffracted by the plane diffraction grating 5 are condensed at a second concave mirror 6, and then, are output through an output slit 7.

FIG. 8 is a diagram for describing the configuration of the depolarization plate 3. The depolarization plate 3 illustrated in FIG. 7 includes two wedge plates 3a, 3b, for example. Two wedge plates 3a, 3b are bonded together such that the crystal optical axes thereof are perpendicular to each other. Two wedge plates 3a, 3b are formed of a birefringent material such as crystal plates. Two wedge plates 3a, 3b are cut such that the thickness thereof varies according to a predetermined shape.

In the depolarization plate 3 illustrated in FIG. 8, an ordinary beam of the wedge plate 3a is an extraordinary beam of the wedge plate 3b. An extraordinary beam of the wedge plate 3a is an ordinary beam of the wedge plate 3b. Thus, due to the difference in refractive index of the material, refraction occurs at the depolarization plate 3. Due to the difference in refraction direction, division of light occurs in the Y axis direction (in the direction of a groove of a plane diffraction grating 5 described later). The split light satisfies the following relationship:

$$\alpha = 2(ne - no)\tan\theta_0 \quad (1)$$

where $\alpha$: the angle between two split light beams;
$\theta_0$: a wedge angle;
ne: the refractive index of the ordinary beam; and
no: the refractive index of the extraordinary beam.

FIGS. 6A to 6C schematically illustrate a situation where light enters a plane diffraction grating to be diffracted. FIG. 6A three-dimensionally illustrates a situation where one light beam of the light split by a depolarization plate enters the plane diffraction grating to be diffracted. FIG. 6B two-dimensionally illustrates, along a zx plane, a situation where the light enters the plane diffraction grating to be diffracted. FIG. 6C two-dimensionally illustrates, along an yz plane, the situation where the light enters the plane diffraction grating to be diffracted.

As described above, the incident angle and the diffraction angle of the light can be resolved into zx components and yz components. That is, the incident angle of the light on the zx plane can be defined as $\alpha 1$, and the diffraction angle of the light on the zx plane as $\alpha 2$. On the yz plane, the incident angle of the light is the same as the diffraction angle of the light. Consequently, each of the angles can be defined as $\theta$. In this case, the relationship between the incident angle to the plane diffraction grating and the diffraction angle by the plane diffraction grating is typically represented by the following expression (2):

$$m\lambda = d\cos\theta(\sin\alpha_1 + \sin\alpha_2) \quad (2)$$

where m: a diffraction order;
d: a grating constant;
$\lambda$: a wavelength;
$\theta$: the angle between incident light and the depth direction of the groove;
$\alpha_1$: the incident angle of incident light to the diffraction grating; and
$\alpha_2$: the diffraction angle of diffracted light from the diffraction grating.

Returning to FIG. 7 in view of the above, the relationship between the incident angle to the plane diffraction grating 5 and the diffraction angle by the plane diffraction grating 5 is also represented by the expression (2).

SUMMARY

An optical device includes: a diffraction grating; a depolarization plate containing a birefringent material to eliminate polarization dependency of the diffraction grating; and an optical corrector configured to optically correct diffraction angle deviation of diffracted light due to diffraction at the diffraction grating.

DESCRIPTION OF THE EMBODIMENTS

Figure 1:
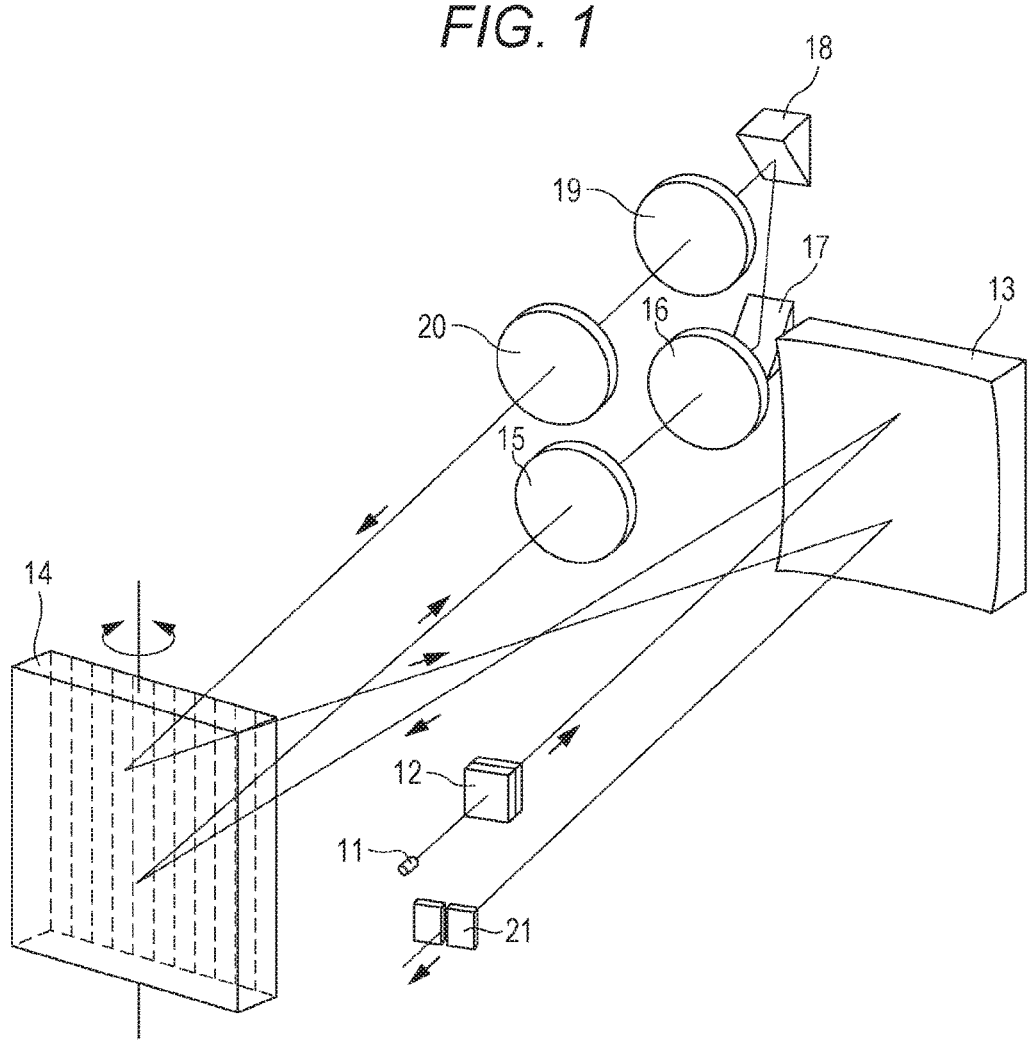
FIG. 1 is a diagram for describing the configuration of a spectrometer of one embodiment of the present disclosure, (an optical path being shown by only one line)

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 7:
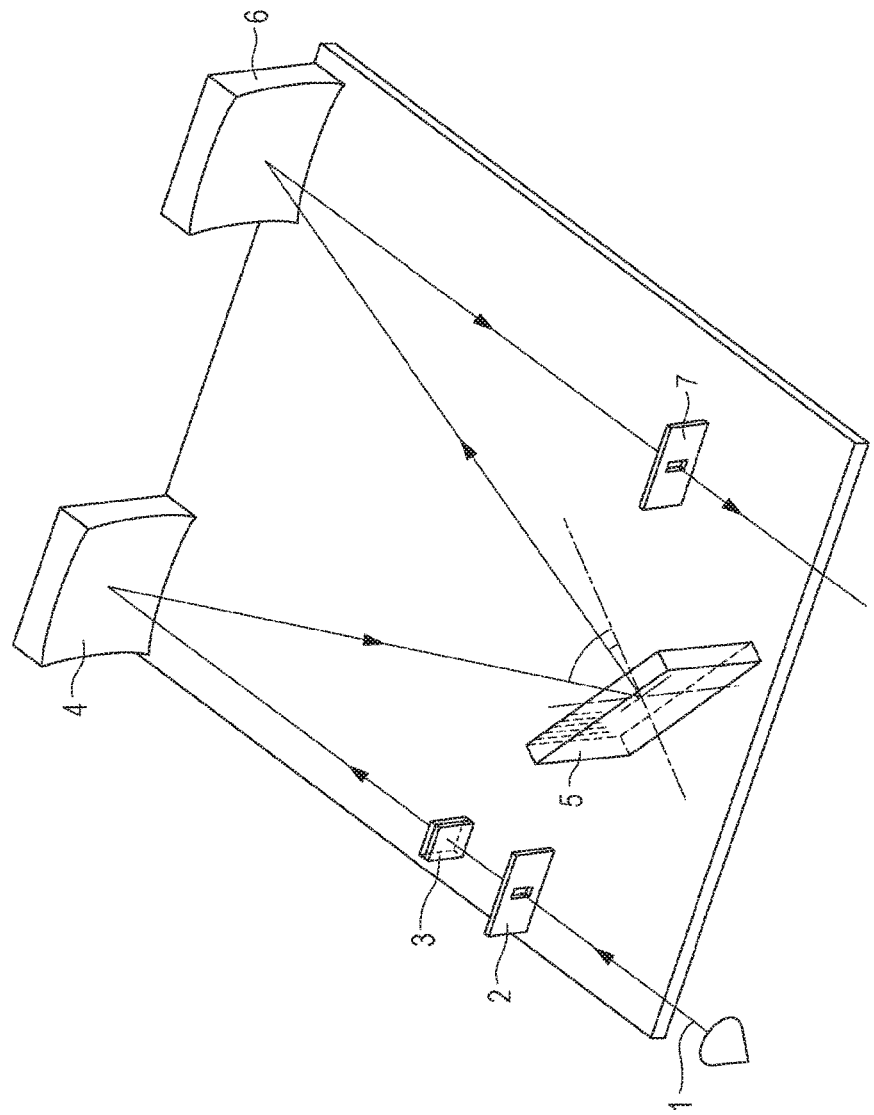
FIG. 7 is a diagram for describing the configuration of an example of a typical spectrometer, (the optical path being shown by only one line)
Figure 8:
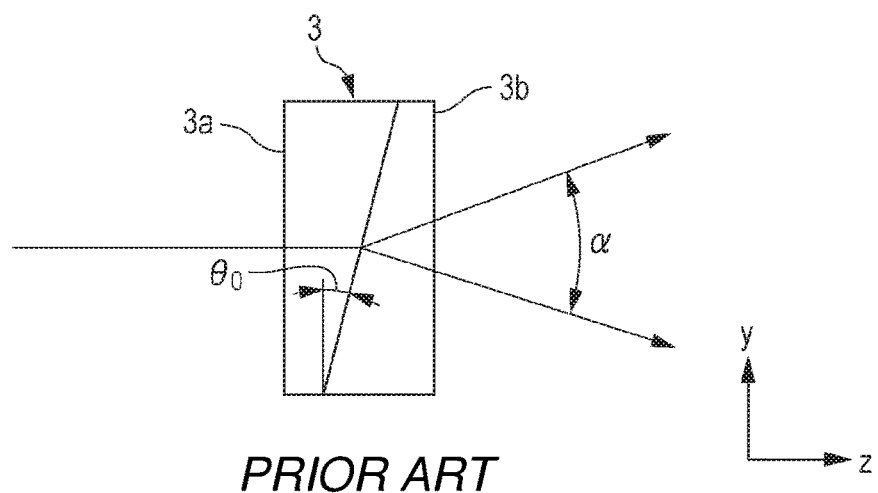
FIG. 8 is a diagram for describing the configuration of a depolarization plate.

In the configuration illustrated in FIGS. 7 and 8, two light beams have the same incident angle $\alpha_1$ in Expression (2). Two light beams from the depolarization plate 3 have a division angle $\alpha$. Thus, the angle $\theta$ between the incident angle of one of the light beams to the plane diffraction grating 5 and the depth direction of the groove of the plane diffraction grating 5 and the angle $\theta$ between the incident angle of the other light beam to the plane diffraction grating 5 and the depth direction of the groove of the plane diffraction grating 5 are different from each other, except for the case where the incident height position of incident light to the concave mirror 4 is coincident with the center axis of the concave mirror 4.

Figure 9:
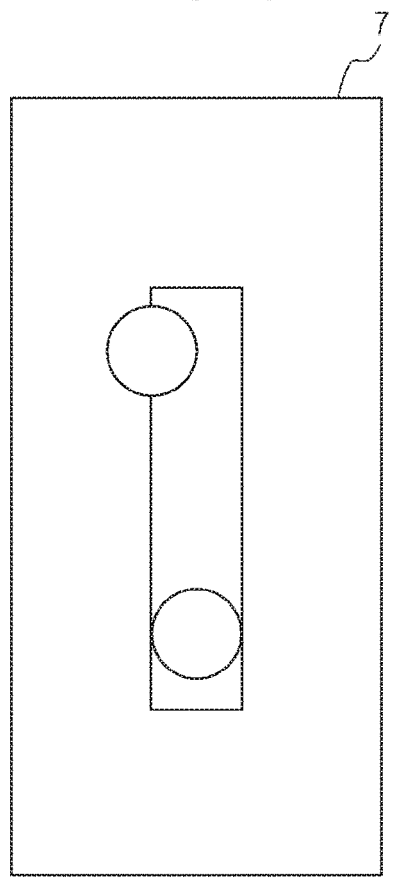
FIG. 9 is a diagram for describing operation of an output slit in a typical configuration.

FIG. 9 is a diagram for describing operation of the output slit 7 illustrated in FIG. 7. The above-described two light beams have different diffraction angles $\alpha_2$. Thus, as indicated by two black points in FIG. 9, two light beams are, in the output slit 7, split in the direction diagonal to the longitudinal direction of a rectangular opening of the output slit 7. Thus, when an attempt is made to cause one of the light beams to pass through the rectangular opening of the output slit 7, it is difficult for the other light beam to pass through the rectangular opening of the output slit 7. This leads to an inaccurate level, and therefore, the performance of measuring a wavelength is lowered.

The output slit 7 selects ones of condensed light beams having a particular wavelength component. The light beams condensed to two points preferably have the same wavelength, and preferably pass through the output slit 7.

Two light beams split by the depolarization plate 3 are converted into parallel light beams by the concave mirror 4, and then, enter the plane diffraction grating 5. If the angle $\theta$ between the incident angle to the plane diffraction grating 5 and the depth of the groove of the plane diffraction grating 5 is the same or substantially the same between these light beams, these two light beams can pass through the narrow output slit 7.

This can be achieved if the incident height position of incident light to the concave mirror 4 is coincident with the center axis of the concave mirror 4. However, since this places a limitation on component arrangement of the spectrometer (monochromator), it is difficult to design the spectrometer.

Moreover, in order to obtain high resolution and a high vicinal dynamic range of the spectrometer, incident light may be diffracted plural times by the plane diffraction grating 5. However, it is more difficult to design the spectrometer such that only light having diffracted plural times passes through the output slit 7.

Further, the angle of the output slit 7 and the light division direction are adjusted to each other so that the narrow output slit 7 can be used, and therefore, the performance of the spectrometer can be enhanced. However, it is difficult to adjust, within a wide wavelength range, the angle of the output slit 7 and the light division direction. Typically, the direction of division into two light beams and the angle of the output slit 7 becomes out of adjustment with each other.

In addition, when the intermediate incident position between two light beams and each center axis of the concave mirrors 4, 6 are coincident with each other, the diffraction angle is the same between two diffracted light beams. However, the diffracted light returns in the same optical path as that of the incident light. For this reason, in this case, an additional component is used to extract only the diffracted light beams from the overlapping light beams. This is disadvantageous in performance and cost.

One objective of the present disclosure is to provide an optical device configured to reduce, within a wide wavelength range, misadjustment of two split light beams and a slit angle and to have improved wavelength resolution and wavelength accuracy.

An optical device according to one embodiment of the present disclosure (the optical device) includes: a diffraction grating; a depolarization plate containing a birefringent material to eliminate polarization dependency of the diffraction grating; and an optical corrector configured to optically correct diffraction angle deviation of diffracted light due to diffraction at the diffraction grating.

In the optical device, the optical corrector may be configured to bend back the diffracted light diffracted by the diffraction grating to re-emit the light to the diffraction grating.

In the optical device, the optical corrector may be configured to invert a positional relationship of the diffracted light in a diffusion direction without changing a positional relationship of the diffracted light in a non-diffusion direction.

In the optical device, the optical corrector may include a first lens configured to condense the diffracted light diffracted by the diffraction grating, a second lens configured to convert the light diffusing after condensed by the first lens into parallel light, a first mirror configured to reflect the light emitted from the second lens such that an optical path thereof is bent at a right angle, a second mirror configured to reflect the light reflected by the first mirror such that an optical path thereof is bent at the right angle, a third lens configured to condense the light reflected by the second mirror, and a fourth lens configured to convert the light diffusing after condensed by the third lens into parallel light to emit the parallel light to the diffraction grating.

In the optical device, the optical corrector may include a concave mirror configured to convert incident light into parallel light to emit the parallel light to the diffraction grating and configured to reflect and condense the diffracted light diffracted by the diffraction grating, a fifth lens configured to convert the light reflected by the concave mirror into parallel light, a third mirror configured to reflect the light emitted from the fifth lens such that an optical path thereof is bent at a right angle, a fourth mirror configured to reflect the light reflected by the third mirror such that an optical path thereof is bent at the right angle, and a sixth lens configured to condense the light reflected by the fourth mirror to emit the condensed light to the concave mirror.

In the optical device, the diffraction angle difference caused due to diffraction in the first half can be corrected by diffraction in the second half. Thus, the optical device is less susceptible to the diffraction angle difference according to the wavelength of the diffraction grating. Accordingly, the optical device can improve the wavelength resolution and the wavelength accuracy within a wide wavelength range.

An embodiment of the present disclosure will be described below in detail. FIG. 1 is a diagram for describing the configuration of a spectrometer (an example of an optical device) of one embodiment of the present disclosure. As illustrated in FIG. 1, incident light 11 passes through a depolarization plate 12 containing a birefringent material, and then, enters a concave mirror 13. The depolarization plate 12 is a member configured to eliminate the polarization dependency of a plane diffraction grating 14, and contains the birefringent material.

The depolarization plate 12 includes two wedge plates, for example. The two wedge plates are bonded together such that the crystal optical axes thereof are perpendicular to each other, for example. The two wedge plates contain a birefringent material such as crystal plates. Two wedge plates are cut such that the thickness thereof varies according to a predetermined shape.

The concave mirror 13 converts incident light containing light in an unpolarized state and light in a polarized state into parallel light to emit the parallel light to the rotatably-provided plane diffraction grating 14.

A lens (first lens) 15 condenses first diffracted light diffracted by the plane diffraction grating 14.

A lens (second lens) 16 converts the light diffusing after condensed by the lens 15 into parallel light. That is, the lens 16 converts the light condensed by the lens 15 into parallel light. The lens 16 emits the parallel light to a planar mirror 17. In order to bend back the light, the planar mirror 17 is disposed such that the direction of reflected light from the planar mirror 17 is substantially at the right angle to the optical axis of the lens 16. That is, the planar mirror 17 reflects the light emitted from the lens 16 to bend the optical path of such light at the right angle (substantially at the right angle).

The planar mirror (first mirror) 17 emits the reflected light to a planar mirror (second mirror) 18. The planar mirror 18 is disposed such that the direction of the reflected light from the planar mirror 18 is substantially at the right angle to the direction of the reflected light from the planar mirror 17. That is, the planar mirror 18 reflects the reflected light from the planar mirror 17 to bend the optical path of such light at the right angle (substantially at the right angle).

The planar mirror 18 emits the reflected light to a lens 19. The lens (third lens) 19 is disposed such that the optical axis thereof is substantially coincident with the direction of the reflected light from the planar mirror 18.

The lens 19 condenses the light reflected and bent back by the planar mirror 18.

As described above, the light enters the lens 16 to be emitted from the lens 19 via the planar mirrors 17 and 18. As a result, a positional relationship (position) of the light in a diffusion direction is inverted. A positional relationship (position) of the light in a non-diffusion direction is, on the other hand, not changed.

A lens (fourth lens) 20 converts the light condensed by the lens 19 into parallel light. The lens 20 emits the parallel light such that the parallel light enters the plane diffraction grating 14 substantially at the same angle as that of the first diffracted light. That is, the lens 20 converts the light diffusing after condensed by the lens 19 into the parallel light to emit the parallel light to the plane diffraction grating 14.

Second diffracted light diffracted by the plane diffraction grating 14 is emitted to the concave mirror 13.

An output slit 21 is provided near the focal position of the second diffracted light condensed by the concave mirror 13. The output slit 21 extracts light targeted for separation of light and having a predetermined wavelength.

The concave mirror 13 converts the second diffracted light diffracted by the plane diffraction grating 14 into parallel light. The concave mirror 13 emits the parallel light to the output slit 21.

In the spectrometer configured as in FIG. 1, the incident light 11 is refracted at an inclined surface of the depolarization plate 12, and then, is split into two directions. These light beams are reflected and converted into parallel light beams by the concave mirror 13, and then, enter the rotatable plane diffraction grating 14.

Two light beams diffracted by the plane diffraction grating 14 are represented by Expression (2) described below, Expression (2) being the relational expression among the wavelength of incident light to the plane diffraction grating 14, the angle of incidence to the plane diffraction grating 14, and the angle of light diffracted by the plane diffraction grating 14:

$$m\lambda = d \cos \theta (\sin \alpha_1 + \sin \alpha_2) \quad (2)$$

where m: a diffraction order;
d: a grating constant;
λ: a wavelength;
θ: the angle between incident light and the depth direction of the groove;
$\alpha_1$: the incident angle of incident light to the diffraction grating; and
$\alpha_2$: the diffraction angle of diffracted light from the diffraction grating.

The incident angle $\alpha_1$ is the same between two light beams diffracted by the plane diffraction grating 14, whereas the angle θ is different between these light beams. Thus, even if these diffracted light beams have the same wavelength, there is a difference in value of the diffraction angle $\alpha_2$. When the diffracted light beams having different diffraction angles $\alpha_2$ are condensed by the lens, two light beams are, at the focal position, condensed with being shifted from each other as described above with reference to FIG. 9.

The same applies to, e.g., the case where first diffracted light is, as second incident light, emitted to a diffraction grating by a mirror. In this case, the difference in diffraction angle $\alpha_2$ becomes greater, and the relationship in which the diffraction angles $\alpha_2$ are not the same as each other is not changed.

In the present embodiment, the first diffracted light is first condensed by the lens 15. The lens 16 is provided at such a position that the condensed light diffuses. After converted into the parallel light by the lens 16, the first diffracted light is bent back by two mirrors 17, 18 arranged such that the light is bent substantially at the right angle. Thus, a vertical angle relationship of the first diffracted light is inverted.

Figure 2:
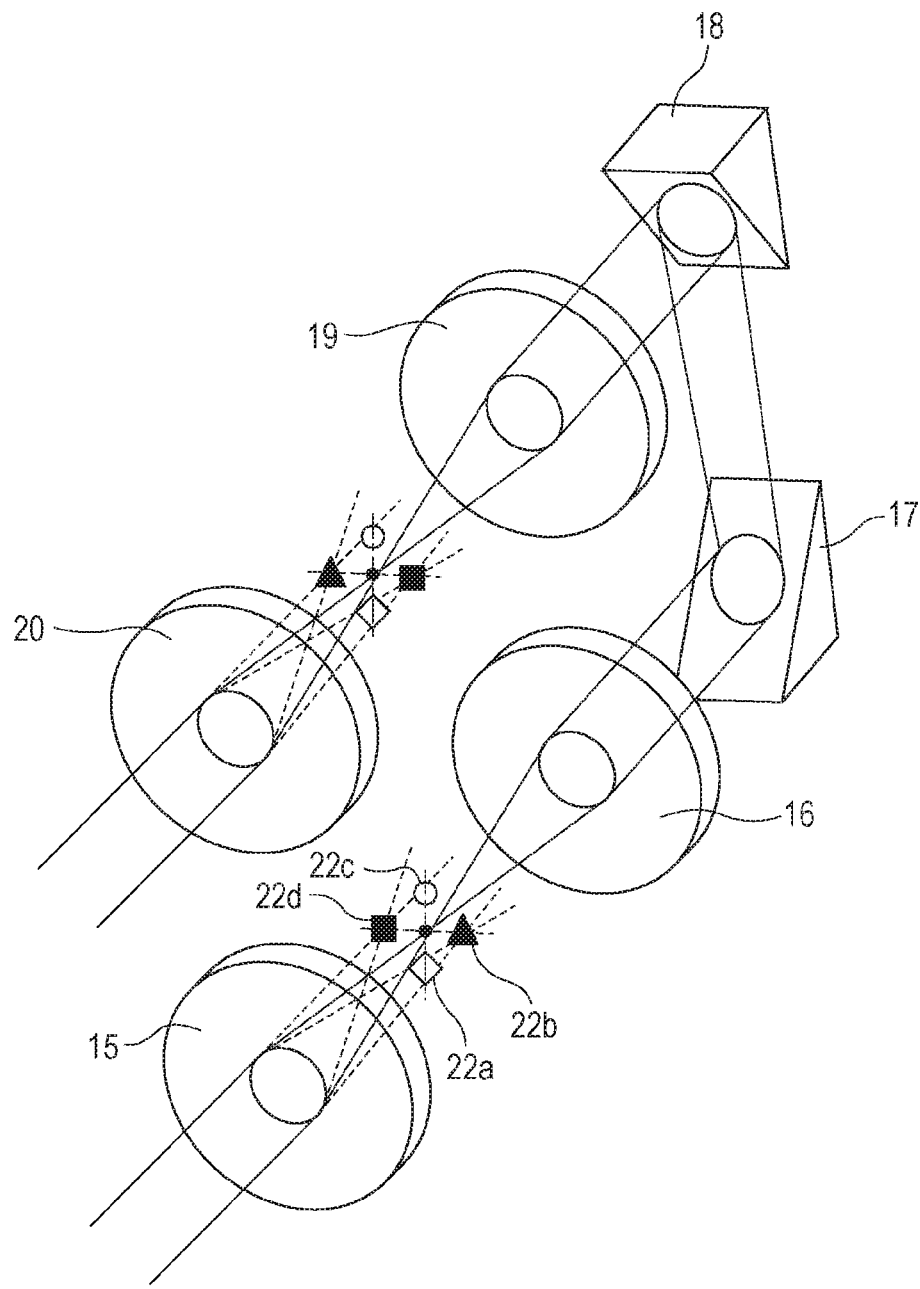
FIG. 2 is a diagram for describing operation of a main portion of the spectrometer illustrated in FIG. 1, (the optical path being shown by only one line)

FIG. 2 is a diagram for describing operation of a main portion of FIG. 1. In FIG. 2, the same reference numerals are used to represent the same elements as those of FIG. 1. The parallel light bent back by the mirrors 17, 18 is condensed by the lens 19. FIG. 2 illustrates positions of the focal positions. FIG. 2 illustrates the positions of the focal positions of the light immediately before entering the lens 16 and the light immediately before entering the lens 20. Bending back of the light by the mirrors 17, 18 does not change the positional relationship between focal positions 22a, 22c of the first diffracted light in the non-diffusion direction, whereas inverts focal positions 22b, 22d in the diffusion direction.

That is, the positional relationship between the shifted focal points is inverted. The first diffracted light diffuses from this state, and is re-converted into the parallel light by the lens 20. These parallel light beams enter, as the second incident light, the diffraction grating substantially at the same angle as that of the first diffracted light. In such a state, the positional relationship between the optical center axis of the lens 20 and the focal point of the lens 20 and the positional relationship (the positional relationship in the first input) between the optical center axis of the lens 15 and the focal point of the lens 15 are adjusted to each other, and therefore, the incident angle to the plane diffraction grating 14 is the same or substantially the same between the parallel light beams from the lens 20.

In the above-described manner, second diffraction is performed. For the second diffracted light beams, a value of $\theta$ in Expression (2) is different, and therefore, the diffraction angle $\alpha_2$ is also different. In the case of providing a configuration (e.g., a reflective member) for third diffraction, the same applies to the third diffraction.

In the present embodiment, the angle $\theta$ of two light beams entering the plane diffraction grating 14 in the second diffraction and the angle $\theta$ of two light beams entering the plane diffraction grating 14 in the first diffraction are substantially the same, but are inverted. Thus, the difference in diffraction angle $\alpha_2$ between two diffracted light beams in the second diffraction and the difference in diffraction angle $\alpha_2$ between two diffracted light beams in the first diffraction are the same, but are in an opposite direction (with opposite signs) (deviate from each other in a reverse direction). As a result, a correction function of canceling, by the second diffraction, the difference in diffraction angle $\alpha_2$ in the preceding diffraction (the first diffraction) is obtained.

That is, the spectrometer of the present embodiment includes an optical corrector configured to optically correct the diffraction angle deviation of diffracted light beams (e.g., two diffracted light beams) due to diffraction at the plane diffraction grating 14. The optical corrector is configured to bend back light diffracted by the plane diffraction grating 14 to re-emit such light to the plane diffraction grating 14. The optical corrector is configured to invert the positional relationship (e.g., the focal point relationship) of diffracted light in the diffusion direction without changing the positional relationship (e.g., the focal point relationship) of the diffracted light in the non-diffusion direction. The optical corrector includes, for example, the lens 15, the lens 16, the planar mirror 17, the planar mirror 18, the lens 19, and the lens 20.

Typically, when the light enters the plane diffraction grating to be diffracted, the diffraction angle of the light depends on the wavelength of the light. That is, when the wavelength of the light is different, the diffraction angle to be obtained is also different. The spectrometer including no optical corrector has no influence on the positional relationship of the light in the diffusion direction. Therefore, the light entering the plane diffraction grating to be diffracted for the second time returns to the state before being diffracted for the first time. The spectrometer including the optical corrector, on the other hand, can invert the positional relationship (the focal point relationship) of the diffracted light in the diffusion direction. Therefore, when the light re-enters the plane diffraction grating, the light is diffracted so that the difference in the diffraction angle due to the difference in the wavelength of the light becomes wider. By using such effect, the wavelength resolution of the spectrometer including the optical corrector can be enhanced.

Figure 3:
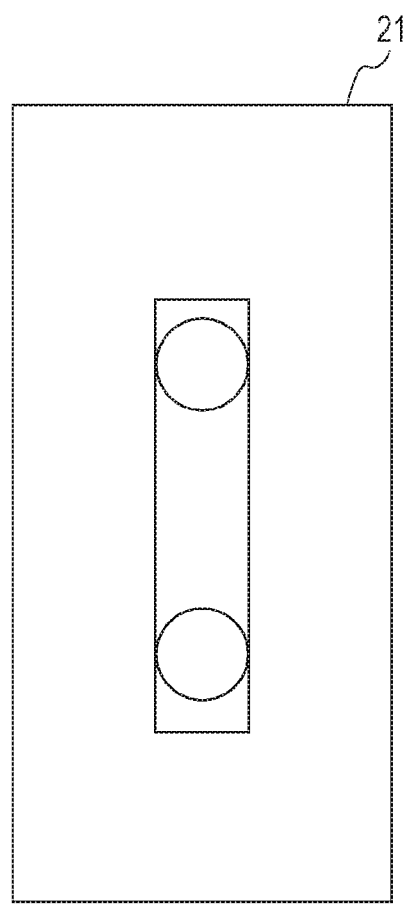
FIG. 3 is a diagram for describing operation of an output slit.

FIG. 3 is a diagram for describing operation of the output slit 21 of FIG. 1. In the output slit 21, two split light beams are, as illustrated in FIG. 3, linearly positioned along the rectangular opening of the output slit 21. Thus, a slit having a narrow rectangular opening can be used as the output slit 21.

In the spectrometer of the present embodiment, the narrow slit is used to select a wavelength, and therefore, the wavelength resolution and the wavelength accuracy can be enhanced. Thus, the present embodiment can enhance the wavelength resolution and accuracy.

Moreover, the spectrometer of the present embodiment is configured such that the diffraction angle difference caused due to diffraction in the first half (e.g., the first diffraction) is corrected by diffraction in the second half (e.g., the second diffraction). Thus, the spectrometer of the present embodiment is less susceptible to the influence of the diffraction angle difference according to the wavelength in the diffraction grating. Consequently, the spectrometer of the present embodiment can be also used as a corrector for a diffraction angle within a wide wavelength range.

Figure 4:
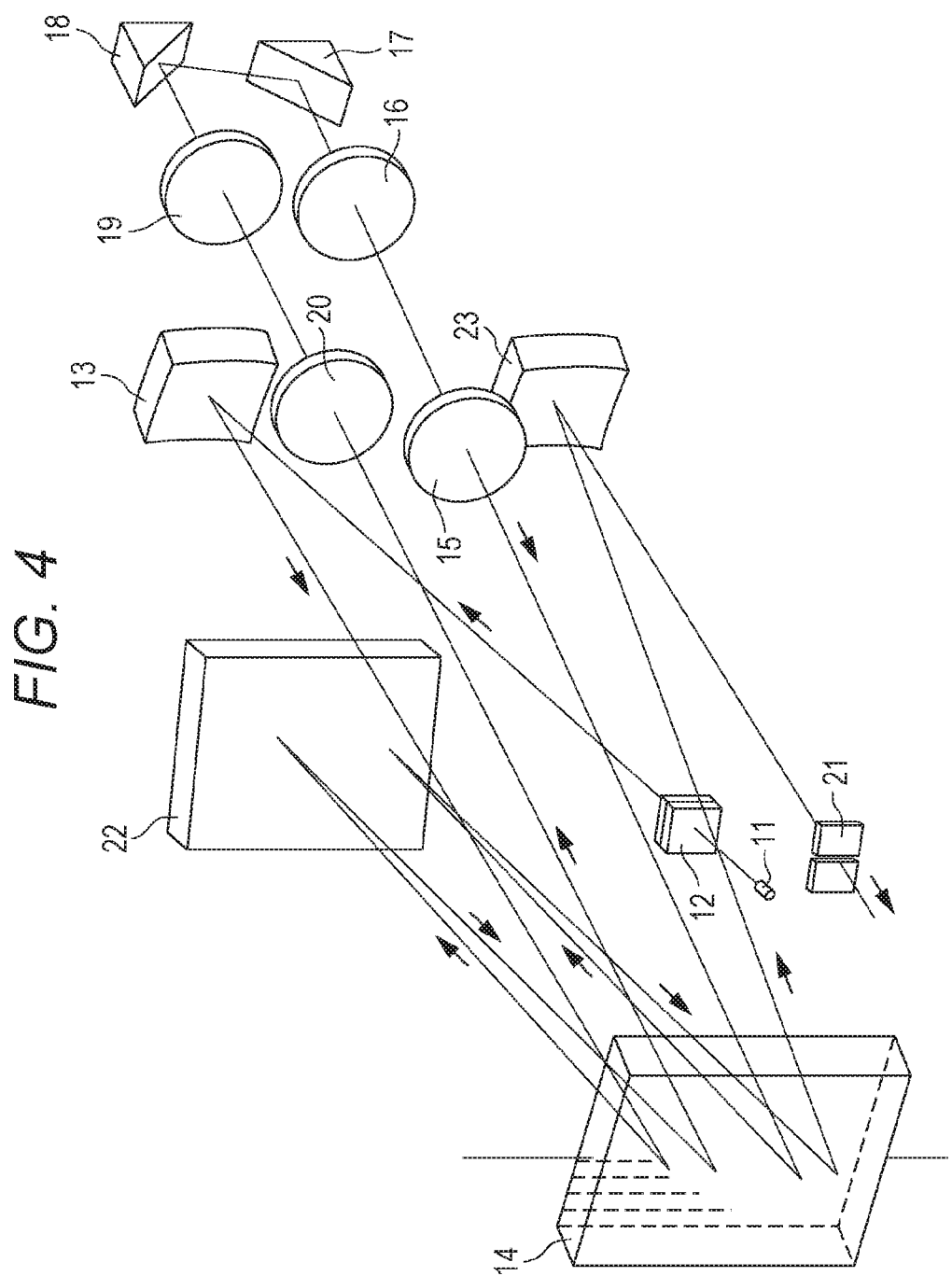
FIG. 4 is a diagram for describing the configuration of a spectrometer of another embodiment of the present disclosure, (the optical path being shown by only one line)

FIG. 4 is a diagram for describing the configuration of another embodiment of the present disclosure. In FIG. 4, the same reference numerals are used to represent the same elements as those of FIG. 1. In the configuration illustrated in FIG. 4, incident light 11 enters a concave mirror 13 through a depolarization plate 12, and then, is converted into parallel light. The parallel light enters a rotatably-provided plane diffraction grating 14. In this manner, first diffraction is performed.

The plane diffraction grating 14 emits first diffracted light to a reflector 22. The reflector 22 reflects the first diffracted light to emit, as second incident light, such light to the plane diffraction grating 14.

The plane diffraction grating 14 performs second diffraction to emit second diffracted light to a lens 20. The second diffracted light enters, as third incident light, the plane diffraction grating 14 by way of an optical path, the optical path including the lens 20, a lens 19, a planar mirror 18, a planar mirror 17, a lens 16, and a lens 15 in this order.

The plane diffraction grating 14 performs third diffraction to emit third diffracted light to the reflector 22. The reflector 22 reflects the third diffracted light to emit, as fourth incident light, such light to the plane diffraction grating 14.

The plane diffraction grating 14 performs fourth diffraction to emit fourth diffracted light to a concave mirror 23.

The concave mirror 23 condenses the fourth diffracted light diffracted by the plane diffraction grating 14 to emit such light to an output slit 21. The output slit 21 is configured to extract light having a particular wavelength. The output slit 21 is provided near the focal position of the light condensed by the concave mirror 23.

For the diffraction angle of two diffracted light beams in the configuration of FIG. 4, a value of $\theta$ in Expression (2) is different, and therefore, the diffraction angle $\alpha_2$ is also different. However, the angle $\theta$ of two light beams entering the plane diffraction grating 14 in the second diffraction and the angle θ of two light beams entering the plane diffraction grating 14 in first diffraction are substantially the same, but are inverted. Thus, the difference in diffraction angle $\alpha_2$ between two diffracted light beams in the second diffraction and the difference in diffraction angle $\alpha_2$ between two diffracted light beams in the first diffraction are the same, but are in an opposite direction (with opposite signs) (deviate from each other in a reverse direction).

Moreover, the angle θ of two light beams entering the plane diffraction grating 14 in the fourth diffraction and the angle θ of two light beams entering the plane diffraction grating 14 in the third diffraction are substantially the same, but are inverted. Thus, the difference in diffraction angle $\alpha_2$ between two diffracted light beams in the fourth diffraction and the difference in diffraction angle $\alpha_2$ between two diffracted light beams in the third diffraction are the same, but are in an opposite direction (with opposite signs) (deviate from each other in a reverse direction).

As described above, the configuration of FIG. 4 has a correction function (optical corrector) similar to that of the configuration of FIG. 1. The optical corrector of the present embodiment includes, for example, the lens 15, the lens 16, the planar mirror 17, the planar mirror 18, the lens 19, and the lens 20.

With this configuration, two split light beams are, as illustrated in FIG. 3 described above, linearly positioned along the rectangular opening in the output slit 21. Thus, a slit having a narrow rectangular opening can be used as the output slit 21.

Figure 5:
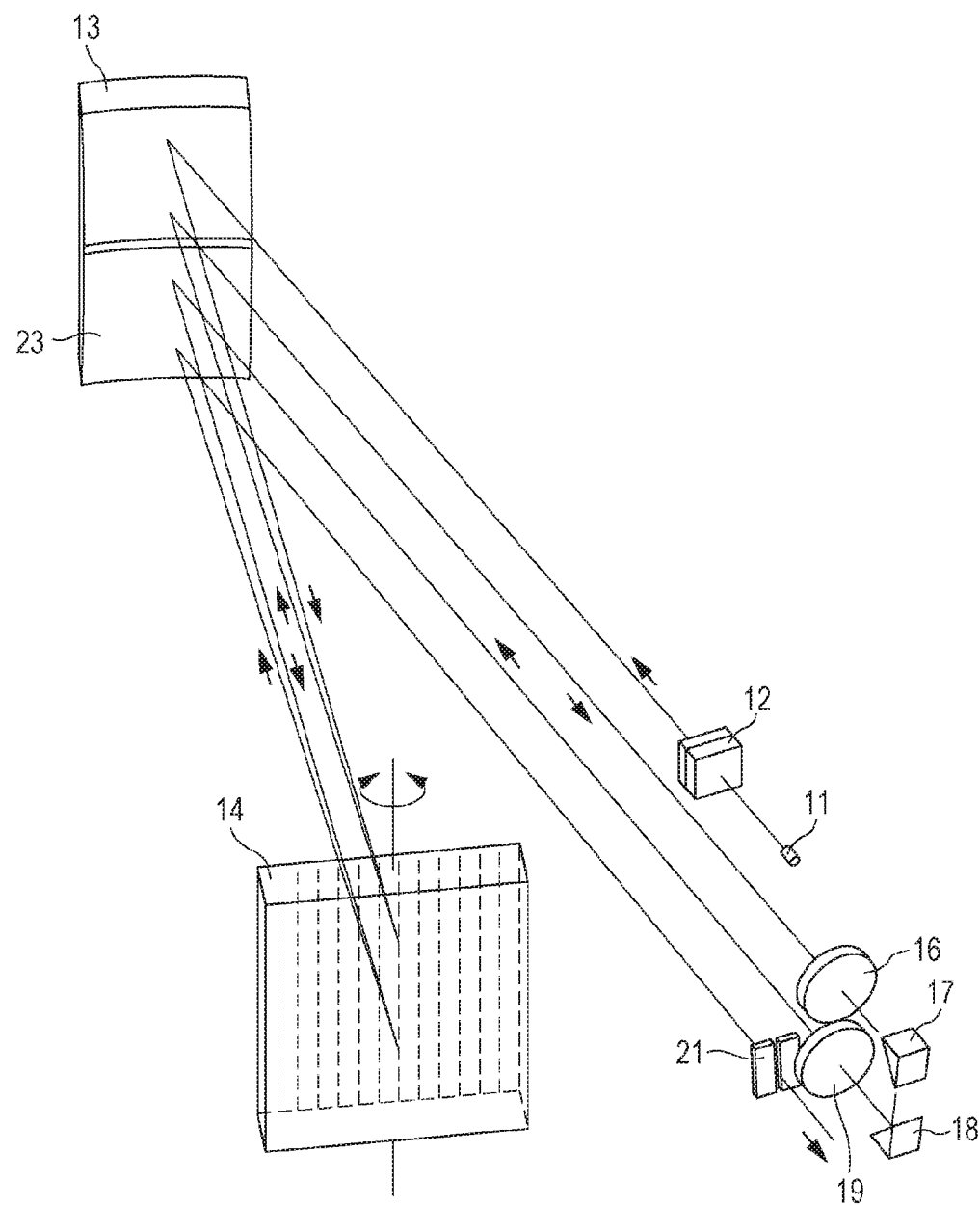
FIG. 5 is a block diagram illustrating a spectrometer of still another embodiment of the present disclosure.
Figure 6A:
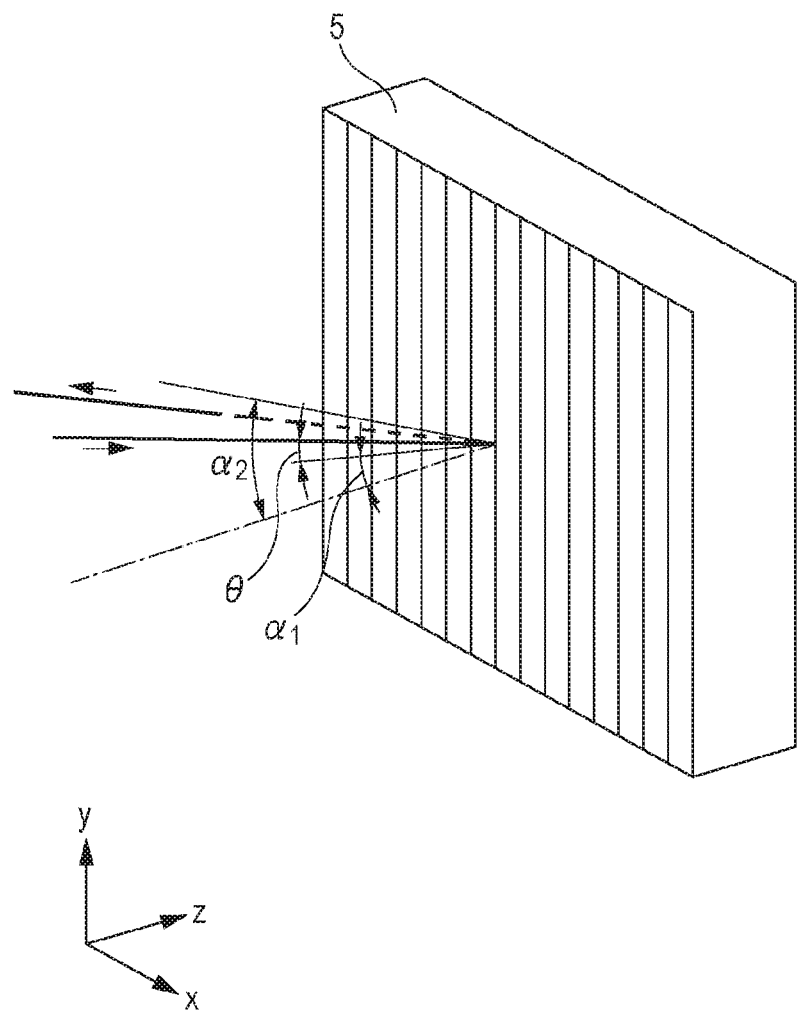
FIG. 6A schematically illustrates a situation where light enters a plane diffraction grating to be diffracted.
Figure 6B:
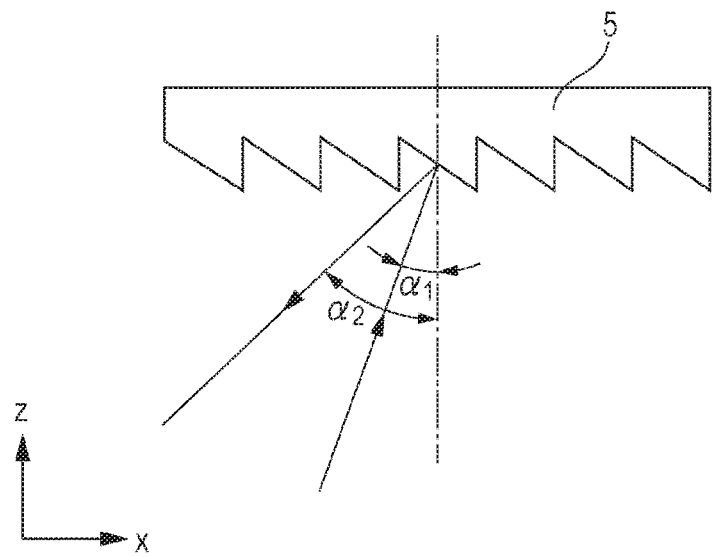
FIG. 6B two-dimensionally illustrates FIG. 6A (along a zx plane)
Figure 6C:
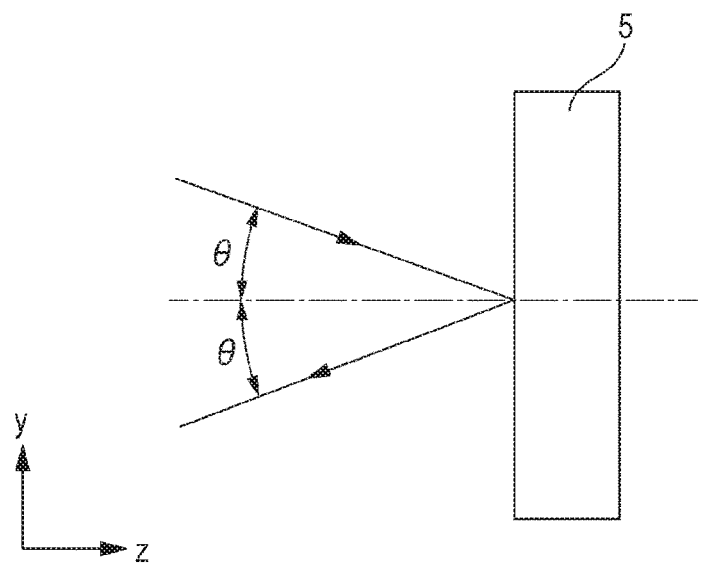
FIG. 6C two-dimensionally illustrates FIG. 6A (along an yz plane)

FIG. 5 is also a diagram for describing the configuration of still another embodiment of the present disclosure. In FIG. 5, the same reference numerals are used to represent the same elements as those of FIG. 1. In the configuration illustrated in FIG. 5, incident light 11 enters a first concave mirror 13 through a depolarization plate 12, and then, is converted into parallel light. The parallel light enters a rotatably-provided plane diffraction grating 14. In this manner, first diffraction is performed.

The plane diffraction grating 14 emits first diffracted light to the first concave mirror 13. The first concave mirror 13 reflects and condenses the first diffracted light to emit such light to a lens (fifth lens) 16. That is, the first concave mirror 13 converts incident light (including the incident light 11) to the first concave mirror 13 into parallel light to emit such light to the plane diffraction grating 14, as well as reflecting and condensing the light diffracted by the plane diffraction grating 14.

The first diffracted light is converted into parallel light by the lens 16. The parallel light is bent back by planar mirrors 17, 18. The planar mirror (third mirror) 17 reflects the light emitted from the lens 16 such that the optical path thereof is bent at the right angle. The planar mirror (fourth mirror) 18 reflects the light reflected by the planar mirror 17 such that the optical path thereof is bent at the right angle.

A lens (sixth lens) 19 condenses the light reflected and bent back by the planar mirror 18 to emit such light to a second concave mirror 23. The second concave mirror 23 converts the incident light into parallel light to emit, as second incident light, such light to the plane diffraction grating 14.

The plane diffraction grating 14 performs second diffraction to emit second diffracted light to the second concave mirror 23.

The second concave mirror 23 reflects and condenses the second diffracted light diffracted by the plane diffraction grating 14 to emit such light to an output slit 21. That is, the second concave mirror 23 converts the incident light to the second concave mirror 23 into parallel light to emit such light to the plane diffraction grating 14, as well as reflecting and condensing the light diffracted by the plane diffraction grating 14. The output slit 21 is configured to extract light having a particular wavelength. The output slit 21 is provided near the focal position of the light condensed by the second concave mirror 23.

The configuration of FIG. 5 has a correction function (optical corrector) similar to that of the configuration of FIG. 1. The optical corrector of the present embodiment includes, for example, the first concave mirror 13, the second concave mirror 23, the lens 16, the planar mirror 17, the planar mirror 18, and the lens 19.

Moreover, according to the configuration of FIG. 5, the function of the lens configured to convert incident light into parallel light to emit the parallel light and the function of the lens configured to condense first diffracted light are achieved using a common single first concave mirror 13. Further, the function of the lens configured to convert bent-back light into parallel light to emit the parallel light to the plane diffraction grating 14 and the function of the concave mirror configured to condense second diffracted light are achieved using a common single second concave mirror 23. Thus, the number of components can be reduced, and therefore, a cost (manufacturing cost) can be reduced. Note that the first concave mirror 13 and the second concave mirror 23 may be the same concave mirror. This further reduces the number of components, and therefore, the cost (manufacturing cost) can be further reduced.

As described above, according to the embodiments of the present disclosure, an optical device having high wavelength resolution and high wavelength accuracy within a wide wavelength range can be provided.

The embodiments of the present disclosure relate to an optical device, and specifically relates to an optical device such as a spectrometer including a depolarization plate using a birefringent material or an optical spectrum analyzer using such a spectrometer.

In the embodiment illustrated in FIG. 1, the lens 16 may convert light condensed by the lens 15 into parallel light without the position of the light in the non-diffusion direction being changed and with the position of the light in the diffusion direction being reversed, and then, may emit the parallel light to the planar mirror 17 disposed substantially at the right angle to the optical axis of the lens 16 to bend back the parallel light. The planar mirror 17 may emit reflected light to the planar mirror 18 disposed substantially at the right angle to the optical axis of the planar mirror 17. The planar mirror 18 may emit reflected light to the lens 19 disposed substantially at the right angle to the optical axis of the planar mirror 18.

In the embodiment illustrated in FIG. 1, the first diffracted light may be first condensed by the lens 15. The lens 16 may be further provided at such a position that the condensed light diffuses, and after conversion of the light into parallel light, the light may be bent back by two mirrors 17, 18 arranged substantially at the right angle to each other. In this manner, the vertical angle relationship of the light may be inverted.

As will be seen from placement of the focal positions in FIG. 2, the positional relationship between the positions 22a, 22c in the non-diffusion direction does not change, but the positions 22b, 22d in the diffusion direction are inverted. That is, the positional relationship between the shifted focal points is inverted. The light diffuses from this state, and is re-converted into parallel light by the lens. Such light enters the diffraction grating substantially at the same angle as the second diffraction angle. In such a state, the positional relationship between the optical center axis of the lens and the focal point of the lens and the positional relationship in the first input are adjusted to each other, and therefore, the incident angle to the diffraction grating is the same between the parallel light beams. In this manner, the second diffraction (the third diffraction in the case of providing the reflection unit configured to perform the second diffraction) is performed. For the diffraction angle of the diffracted light beams in the second diffraction, a value of θ in the relational expression is different, and therefore, the degree of the diffraction angle $\alpha_2$ is also different. A degree of θ is substantially the same as that in the first diffraction, but is inverted. Thus, the diffraction angle $\alpha_2$ deviates in the reverse direction by the same amount as the diffraction angle difference caused in the first diffraction. As a result, the correction function of returning the diffraction angle difference caused in the preceding diffraction to the same value.

Moreover, the spectrometer of the present disclosure is configured such that the diffraction angle difference caused due to diffraction in the first half is corrected in the second half, and therefore, is not susceptible to the influence of the difference in diffraction angle varying according to the wavelength of the diffraction grating. Thus, the spectrometer of the present disclosure can be also used as a correction unit for a diffraction angle within a wide wavelength range.

In the configuration of FIG. 5, the plane diffraction grating 14 may emits the first diffracted light to the first concave mirror 13, and the first concave mirror 13 may reflect the first diffracted light to emit such light to the lens 16. The first diffracted light may enter the second concave mirror 23 by way of the optical path, the optical path including the lens 16, the planar mirror 17, the planar mirror 18, and the lens 19 in this order. Then, such light may enter the plane diffraction grating 14 as the second incident light.

According to the configuration of FIG. 5, the function of the lens configured to convert incident light into parallel light to emit the parallel light and the function of the lens configured to condense the first diffracted light may be achieved using a common single concave mirror 13, and the function of the lens configured to convert bent-back light into parallel light to emit the parallel light to the plane diffraction grating 14 and the function of the concave mirror configured to condense the second diffracted light may be achieved using a common single lens 19. In this case, the number of components can be reduced, and the cost can be reduced.

The embodiments of the present disclosure may relate to the following first to fifth optical devices.

The first optical device is an optical device including a depolarization plate formed of a birefringent material to eliminate the polarization dependency of a diffraction grating. In the optical device, an optical correction unit configured to optically correct diffraction angle deviation due to diffraction at the diffraction grating is provided.

In the second optical device according to the first optical device, the optical correction unit bends back light diffracted by the diffraction grating to re-emit the light to the diffraction grating.

In the third optical device according to the first or second optical device, as will be seen from placement of focal positions of light, the optical correction unit does not change the positional relationship between the focal positions in a non-diffusion direction, but inverts the focal positions in a diffusion direction.

In the fourth optical device according to any one of the first to third optical devices, the optical correction unit includes a first lens configured to condense the light diffracted by the diffraction grating, a second lens configured to convert the light diffusing after condensed by the first lens into parallel light, a first mirror configured to reflect the light emitted from the second lens at the right angle, a second mirror configured to further reflect the light reflected by the first mirror at the right angle to emit the light to the diffraction grating, a third lens configured to condense the light reflected by the second mirror, and a fourth lens configured to convert the light diffusing after condensed by the third lens into parallel light to emit the parallel light to the diffraction grating.

In the fifth optical device according to any one of the first to third optical devices, the optical correction unit includes a concave mirror configured to reflect the light diffracted by the diffraction grating, a first lens configured to receive the light reflected by the concave mirror, a first mirror configured to reflect the light emitted from the first lens at the right angle, a second mirror configured to further reflect the light reflected by the first mirror at the right angle to emit the light to the concave mirror, and a second lens configured to emit the reflected light emitted from the second mirror to the concave mirror. The first and second lenses condense and parallelize the diffracted light.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:
1. An optical device comprising:
 a diffraction grating;
 a depolarization plate containing a birefringent material to eliminate polarization dependency of the diffraction grating; and
 an optical corrector configured to optically correct diffraction angle deviation of diffracted light due to diffraction at the diffraction grating.
2. The optical device according to claim 1, wherein
 the optical corrector is configured to bend back the diffracted light diffracted by the diffraction grating to re-emit the light to the diffraction grating.
3. The optical device according to claim 1, wherein
 the optical corrector is configured to invert a positional relationship of the diffracted light in a diffusion direction without changing a positional relationship of the diffracted light in a non-diffusion direction.
4. The optical device according to claim 2, wherein
 the optical corrector is configured to invert a positional relationship of the diffracted light in a diffusion direction without changing a positional relationship of the diffracted light in a non-diffusion direction.
5. The optical device according to claim 1, wherein
 the optical corrector includes
 a first lens configured to condense the diffracted light diffracted by the diffraction grating,
 a second lens configured to convert the light, diffusing after being condensed by the first lens, into parallel light, a first mirror configured to reflect the light emitted from the second lens such that an optical path thereof is bent at a right angle, a second mirror configured to reflect the light reflected by the first mirror such that the optical path thereof is bent at the right angle, a third lens configured to condense the light reflected by the second mirror, and a fourth lens configured to convert the light, diffusing after being condensed by the third lens, into parallel light to emit the parallel light to the diffraction grating.

6. The optical device according to claim 2, wherein the optical corrector includes a first lens configured to condense the diffracted light diffracted by the diffraction grating, a second lens configured to convert the light, diffusing after being condensed by the first lens, into parallel light, a first mirror configured to reflect the light emitted from the second lens such that an optical path thereof is bent at a right angle, a second mirror configured to reflect the light reflected by the first mirror such that the optical path thereof is bent at the right angle, a third lens configured to condense the light reflected by the second mirror, and a fourth lens configured to convert the light, diffusing after being condensed by the third lens, into parallel light to emit the parallel light to the diffraction grating.

7. The optical device according to claim 3, wherein the optical corrector includes a first lens configured to condense the diffracted light diffracted by the diffraction grating, a second lens configured to convert the light, diffusing after being condensed by the first lens, into parallel light, a first mirror configured to reflect the light emitted from the second lens such that an optical path thereof is bent at a right angle, a second mirror configured to reflect the light reflected by the first mirror such that the optical path thereof is bent at the right angle, a third lens configured to condense the light reflected by the second mirror, and a fourth lens configured to convert the light, diffusing after being condensed by the third lens, into parallel light to emit the parallel light to the diffraction grating.

8. The optical device according to claim 4, wherein the optical corrector includes a first lens configured to condense the diffracted light diffracted by the diffraction grating, a second lens configured to convert the light, diffusing after being condensed by the first lens, into parallel light, a first mirror configured to reflect the light emitted from the second lens such that an optical path thereof is bent at a right angle, a second mirror configured to reflect the light reflected by the first mirror such that the optical path thereof is bent at the right angle, a third lens configured to condense the light reflected by the second mirror, and a fourth lens configured to convert the light, diffusing after being condensed by the third lens, into parallel light to emit the parallel light to the diffraction grating.

9. The optical device according to claim 1, wherein the optical corrector includes a concave mirror configured to convert incident light into parallel light to emit the parallel light to the diffraction grating and configured to reflect and condense the diffracted light diffracted by the diffraction grating, a fifth lens configured to convert the light reflected by the concave mirror into parallel light, a third mirror configured to reflect the light emitted from the fifth lens such that an optical path thereof is bent at a right angle, a fourth mirror configured to reflect the light reflected by the third mirror such that the optical path thereof is bent at the right angle, and a sixth lens configured to condense the light reflected by the fourth mirror to emit the condensed light to the concave mirror.

10. The optical device according to claim 2, wherein the optical corrector includes a concave mirror configured to convert incident light into parallel light to emit the parallel light to the diffraction grating and configured to reflect and condense the diffracted light diffracted by the diffraction grating, a fifth lens configured to convert the light reflected by the concave mirror into parallel light, a third mirror configured to reflect the light emitted from the fifth lens such that an optical path thereof is bent at a right angle, a fourth mirror configured to reflect the light reflected by the third mirror such that the optical path thereof is bent at the right angle, and a sixth lens configured to condense the light reflected by the fourth mirror to emit the condensed light to the concave mirror.

11. The optical device according to claim 3, wherein the optical corrector includes a concave mirror configured to convert incident light into parallel light to emit the parallel light to the diffraction grating and configured to reflect and condense the diffracted light diffracted by the diffraction grating, a fifth lens configured to convert the light reflected by the concave mirror into parallel light, a third mirror configured to reflect the light emitted from the fifth lens such that an optical path thereof is bent at a right angle, a fourth mirror configured to reflect the light reflected by the third mirror such that the optical path thereof is bent at the right angle, and a sixth lens configured to condense the light reflected by the fourth mirror to emit the condensed light to the concave mirror.

12. The optical device according to claim 4, wherein the optical corrector includes a concave mirror configured to convert incident light into parallel light to emit the parallel light to the diffraction grating and configured to reflect and condense the diffracted light diffracted by the diffraction grating, a fifth lens configured to convert the light reflected by the concave mirror into parallel light, a third mirror configured to reflect the light emitted from the fifth lens such that an optical path thereof is bent at a right angle, a fourth mirror configured to reflect the light reflected by the third mirror such that the optical path thereof is bent at the right angle, and a sixth lens configured to condense the light reflected by the fourth mirror to emit the condensed light to the concave mirror.

* * * * *